US011181168B2

(12) United States Patent
Hattori et al.

(10) Patent No.: US 11,181,168 B2
(45) Date of Patent: Nov. 23, 2021

(54) CHAIN BELT AND METHOD OF MANUFACTURING THE SAME

(71) Applicant: TOYOTA JIDOSHA KABUSHIKI KAISHA, Toyota (JP)

(72) Inventors: Yuji Hattori, Ichinomiya (JP); Akira Ijichi, Odawara (JP); Naoyuki Shibata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 427 days.

(21) Appl. No.: 16/184,709

(22) Filed: Nov. 8, 2018

(65) Prior Publication Data

US 2019/0145495 A1 May 16, 2019

(30) Foreign Application Priority Data

Nov. 10, 2017 (JP) .............................. JP2017-217827

(51) Int. Cl.
 *F16G 5/18* (2006.01)
 *B23K 9/00* (2006.01)
 (Continued)

(52) U.S. Cl.
 CPC .................. *F16G 5/18* (2013.01); *B21L 9/02* (2013.01); *B23K 9/0026* (2013.01); *F16G 1/22* (2013.01);
 (Continued)

(58) Field of Classification Search
 CPC ..... F16G 5/00; F16G 5/16; F16G 5/18; F16G 5/20; F16G 1/00; F16G 1/22; F16G 1/24;
 (Continued)

(56) References Cited

U.S. PATENT DOCUMENTS 2,755,677 A * 7/1956 Bremer ................... F16G 13/04
 474/215
6,299,559 B1 * 10/2001 Friedmann ................ F16G 5/18
 474/213
(Continued)

FOREIGN PATENT DOCUMENTS

CN 104948693 A 9/2015
DE 10110896 A1 10/2001
(Continued)

*Primary Examiner* — Henry Y Liu
*Assistant Examiner* — Raveen J Dias
(74) *Attorney, Agent, or Firm* — Oliff PLC (57) ABSTRACT

In a chain belt having: plurality of link plates each provided with a pin hole; plurality of connecting pins to connect a part of the plurality of link plates in an endless annular form by being inserted into the pin holes across the part of the plurality of link plates in a state where the part of the plurality of link plates are overlapped; and a retainer pin welded to an end portion of the connecting pin and engaged with the link plate to prevent the link plate from coming off the connecting pin, the retainer pin is disposed in a posture in which an outer circumferential surface is in contact with an outer circumferential surface of the connecting pin, and a plurality of points on the outer circumferential surface of the retainer pin separated from each other in the circumferential direction are welded to the connecting pin.

18 Claims, 5 Drawing Sheets (51) Int. Cl.
  *F16H 9/24*   (2006.01)
  *B21L 9/02*   (2006.01)
  *F16G 13/06*  (2006.01)
  *F16G 5/16*   (2006.01)
  *F16G 1/22*   (2006.01)
  *F16G 1/24*   (2006.01)
  *B23K 11/00*  (2006.01)

(52) U.S. Cl.
  CPC ............... *F16G 1/24* (2013.01); *F16G 5/16* (2013.01); *F16G 13/06* (2013.01); *F16H 9/24* (2013.01); *B23K 9/00* (2013.01); *B23K 11/00* (2013.01)

(58) Field of Classification Search
  CPC . F16G 1/28; F16G 13/00; F16G 13/02; F16G 13/04; F16G 13/06; F16G 13/07; F16G 13/08; F16G 7/00; F16G 7/04; B23K 9/00; B23K 9/0026; B23K 11/00; B23K 11/002; B21L 3/00; B21L 3/02; B21L 9/00; B21L 9/02; B21L 9/065; B21L 1/00; B21L 7/00; B21L 11/00; B21L 13/00
  See application file for complete search history.

(56) References Cited

U.S. PATENT DOCUMENTS

| | | | | |
|---|---|---|---|---|
| 6,346,058 | B1* | 2/2002 | Linnenbrugger | F16G 5/18 474/212 |
| 6,393,819 | B1* | 5/2002 | Matsuno | F16G 13/04 474/215 |
| 2001/0023575 | A1* | 9/2001 | Linnenbrugger | B21L 9/08 59/31 |
| 2006/0270504 | A1* | 11/2006 | Krause | F16G 5/18 474/204 |
| 2015/0267775 | A1 | 9/2015 | Ichijo et al. | |
| 2017/0284505 | A1* | 10/2017 | Crowe | F16G 13/06 |

FOREIGN PATENT DOCUMENTS

| | | | |
|---|---|---|---|
| DE | 102016124537 A1 | 6/2018 | |
| JP | S57-088923 A | 6/1982 | |
| JP | S62-156080 A | 7/1987 | |
| JP | H03-279073 A | 12/1991 | |
| JP | 2001-108023 A | 4/2001 | |
| JP | 2011-179525 A | 9/2011 | |
| JP | 2015-132324 A | 7/2015 | |
| JP | 2015129565 A * | 7/2015 | |
| JP | 2015-183744 A | 10/2015 | |
| WO | WO-2014173410 A2 * | 10/2014 | ............... B21L 9/08 |

* cited by examiner

CHAIN BELT AND METHOD OF MANUFACTURING THE SAME

This application claims priority from Japanese Patent Application No. 2017-217827 filed on Nov. 10, 2017, the disclosure of which is herein incorporated by reference in its entirety.

FIELD OF THE ART

The present invention relates to a chain belt to be used for a belt-driven continuously variable transmission, etc., and specifically, to an improvement in a connecting pin to connect plurality of link plates.

BACKGROUND ART

A chain belt is known which includes (a) plurality of link plates each provided with a pin hole, (b) plurality of connecting pins configured to connect a part of the plurality of link plates in an endless annular form by being inserted into the pin holes across the part of the plurality of link plates in a state where the part of the plurality of link plates are overlapped in a thickness direction and shifted in a width direction, and (c) a retainer pin welded to an end portion of the connecting pin and engaged with the link plate to prevent the link plate from coming off the connecting pin. A device described in Patent Document 1 is an example of the chain belt, and is used for a belt-driven continuously variable transmission.

PRIOR ART DOCUMENT

Patent Document

[PATENT DOCUMENT 1] Japan Patent Publication No. 2015-183744

SUMMARY OF THE INVENTION

Technical Problem

However, in such a conventional chain belt, the retainer pin is welded at one point on an end face or side surface to a connecting pin, so that due to variation in welding, for example, a difference in welding depth, etc., joint strength may become insufficient, and the retainer pin may come off the connecting pin due to a force applied from the link plate. Therefore, welding quality including a welding depth, etc., must be strictly controlled, and this results in an increase in cost.

The present invention was made in view of the above-described circumstances, and an object thereof is to enable welding with predetermined joint strength of a retainer pin to a connecting pin regardless of variation in welding, etc., and to relax control of welding quality including the welding depth, etc., and reduce the costs.

Solution to Problem

To achieve the above object, a first aspect of the present invention provides a chain belt comprising: (a) plurality of link plates each provided with a pin hole; (b) plurality of connecting pins to connect apart of the plurality of link plates in an endless annular form by being inserted into the pin holes across the part of the plurality of link plates in a state where the part of the plurality of link plates are overlapped in a thickness direction and shifted in a width direction; and (c) a retainer pin welded to an end portion of the connecting pin and engaged with the link plate to prevent the link plate from coming off the connecting pin, wherein (d) the retainer pin is disposed in a posture in which an outer circumferential surface is in contact with an outer circumferential surface of the connecting pin, and a plurality of points on the outer circumferential surface of the retainer pin separated from each other in the circumferential direction are welded to the connecting pin.

A second aspect of the present invention provides the chain belt recited in the first aspect of the invention, wherein (a) either one of the retainer pin and the connecting pin is provided with a linear groove in an axial direction, and (b) the retainer pin is welded to the connecting pin along two open end edges on both sides of the linear groove.

A third aspect of the present invention provides the chain belt recited in the second aspect of the invention, wherein (a) the linear groove is provided on the connecting pin so as to become parallel to an axis of the connecting pin, and (b) the retainer pin is disposed parallel to the linear groove, and welded at two points on the outer circumferential surface to the connecting pin along the two open end edges of the linear groove across the entire length in the axial direction.

A fourth aspect of the present invention provides the chain belt recited in the third aspect of the invention, wherein (a) the linear groove is provided on the connecting pin so as to become parallel to the axis of the connecting pin across the entire length in the axial direction, and (b) the retainer pins are respectively welded to both end portions of the connecting pin.

A fifth aspect of the present invention provides the chain belt recited in any one of the first to fourth aspects of the invention, wherein the retainer pin is welded to the connecting pin so as to be engaged with an outer-circumferential-side portion of the link plate forming an endless annular form by the connecting pin.

A sixth aspect of the present invention provides the chain belt recited in any one of the first to fifth aspects of the invention, wherein the chain belt is a chain belt for a belt-driven continuously variable transmission, to be used by being wound over a pair of variable pulleys having V-shaped grooves whose widths are variable.

A seventh aspect of the present invention provides a method of manufacturing a chain belt including (a) plurality of link plates each provided with a pin hole, (b) plurality of connecting pins to connect a part of the plurality of link plates in an endless annular form by being inserted into the pin holes across the part of the plurality of link plates in a state where the part of the plurality of link plates are overlapped in a thickness direction and shifted in a width direction, and (c) a retainer pin welded to an end portion of the connecting pin and engaged with the link plate to prevent the link plate from coming off the connecting pin, wherein (d) either one of the retainer pin and the connecting pin is provided with a linear groove in an axial direction, and (e) the retainer pin is resistance-welded to the connecting pin along two open end edges on both sides of the linear groove in a state where the retainer pin is disposed so as to come into contact at two points on an outer circumferential surface separated from each other in a circumferential direction with an outer circumferential surface of the connecting pin via the two open end edges.

The above-described resistance welding is a method of welding in which, in a state where a retainer pin and a connecting pin are brought into contact with each other and pressurized, by supplying an electric current between these, a contact portion between these pins is molten and welded by heating by electric resistance at the contact portion.

An eighth aspect of the present invention provides the method of manufacturing a chain belt recited in the seventh aspect of the invention, wherein (a) the linear groove is provided on the connecting pin so as to become parallel to an axis of the connecting pin, and (b) in a state where the retainer pin is disposed on the connecting pin so as to become parallel to the linear groove and come into contact at the two points on an outer circumferential surface with the two open end edges of the linear groove, the retainer pin is resistance-welded to the connecting pin along the two open end edges.

A ninth aspect of the present invention provides the method of manufacturing a chain belt recited in the eighth aspect of the invention, wherein (a) the connecting pin is provided with the linear groove parallel to the axis of the connecting pin across the entire length in the axial direction, and the linear groove is made at the same time the connecting pin is molded so as to have a predetermined sectional shape by drawing process, and (b) the retainer pins are respectively welded to both end portions of the connecting pin.

Advantageous Effects of Invention

In the chain belt as described above, a plurality of points on the outer circumferential surface of the retainer pin separated from each other in the circumferential direction are welded to the connecting pin, so that joint strength between the connecting pin and the retainer pin becomes higher than in a case where only one point on the outer circumferential surface is welded, so that predetermined joint strength can be easily secured regardless of variation in welding, etc., and the retainer pin can be appropriately prevented from coming off the connecting pin. Accordingly, control of the welding quality including the welding depth, etc., can be relaxed, and cost reduction is realized. Even in the methods of manufacturing according to the seventh to ninth aspects of the invention, substantially the same operation and effect are obtained.

In the chain belt recited in the second aspect of the invention, the linear groove is provided on either one of the retainer pin and the connecting pin, and the retainer pin is welded to the connecting pin along the two open end edges on both sides of the linear groove, so that the joint strength of the retainer pin to the connecting pin is appropriately secured. For example, as in the seventh aspect of the invention, by disposing the retainer pin so as to come into contact with the connecting pin via two open end edges on both sides of the linear groove, the retainer pin can be easily welded to the connecting pin by resistance welding.

In the chain belt recited in the third aspect of the invention, the linear groove is provided parallel to the axis of the connecting pin, and in a state where the retainer pin is disposed parallel to the linear groove, the retainer pin is welded to the connecting pin at two points on the outer circumferential surface along the two open end edges of the linear groove across the entire length in the axial direction of the retainer pin, so that higher joint strength can be stably secured. For example, as in the eighth aspect of the invention, by disposing the retainer pin on the connecting pin so as to become parallel to the linear groove and come into contact at two points on the outer circumferential surface with the two open end edges of the linear groove across the entire length in the axial direction, the retainer pin can be easily welded to the connecting pin by resistance welding.

In the chain belt recited in the fourth aspect of the invention, the linear groove is provided parallel to the axis of the connecting pin across the entire length of the connecting pin, and to both end portions of the linear groove, the retainer pins are welded, so that a substantially symmetrical configuration in the axial direction of the connecting pin is obtained. Therefore, as compared with a case where a large-diameter head portion or the like is provided at one end portion of the connecting pin for preventing the link plate from coming off the connecting pin, the connecting pin can be made to have a simple shape and produced at low cost. The linear groove is provided parallel to the axis of the connecting pin across the entire length of the connecting pin, so that the linear groove can be provided at the same time the connecting pin is molded so as to have a predetermined sectional shape by drawing process, for example, as in the ninth aspect of the invention, so that the connecting pin can be manufactured at low cost.

DESCRIPTION OF THE EMBODIMENT

The present invention is preferably applied to a chain belt for a belt-driven continuously variable transmission to be used for, for example, a vehicle, and also applicable to various chain belts such as a chain belt to be used for a belt-driven continuously variable transmission other than that for a vehicle or to be used by being wound over a pair of pulleys with a constant gear ratio, and a chain belt to be used by being wound over three or more pulleys. A pair of retainer pins are symmetrically about the axial direction welded on, for example, both end portions in an axial direction of a connecting pin, however, a connecting pin which is provided with a large-diameter head portion, a snap ring, or the like on one end portion to prevent coming off, and to which a retainer pin is welded only on the other end portion, can also be used.

For welding at a plurality of points on an outer circumferential surface of a retainer pin, for example, a linear groove is provided in an axial direction on either one of the retainer pin and the connecting pin, and the retainer pin is welded to the connecting pin by resistance welding, etc., along two open end edges on both sides of the linear groove, however, it is also possible that the linear groove is not provided, and for example, a pair of ridge portions of a retainer pin having a prism shape are welded to the connecting pin by laser welding, etc. It is also possible that two or more linear grooves are provided to be adjacent to each other, and three or more open end edges are welded by resistance welding, etc. Various forms are also possible such as a form in which a plurality of projection lines are provided in the axial direction and resistance welding is performed. The linear groove may have an arc shape in section, or may have various forms such as a V shape, a U shape, or a square-shape in section. The linear groove is preferably provided on the connecting pin, however, the linear groove may be provided on the retainer pin. The linear groove is preferably provided parallel to, for example, an axis of the connecting pin or the retainer pin, or may be an inclined groove inclined with respect to the axis thereof.

When the linear groove is provided on the connecting pin, the linear groove may be provided only on at least one end portion in an axial direction by press work, cutting work, or laser machining, etc., however, when retainer pins are welded to both end portions in the axial direction, the linear groove is preferably provided parallel to the axis of the connecting pin across the entire length in the axial direction of the connecting pin. In this case, the linear groove can be provided at the same time the connecting pin is molded so as to have a predetermined sectional shape by drawing process, however, the linear groove can also be provided by post processing by press work, cutting work, or laser machining, etc. The connecting pin itself can be manufactured by a processing method other than drawing process, for example, forge processing.

When the linear groove is provided on the connecting pin, a retainer pin being circular and columnar in section is appropriate, however, a shaft-shaped member being oval or square in section can also be adopted. When a circular columnar retainer pin is used, a round steel bar or wire material, etc., can be used as it is, so that the retainer pin can be produced at low cost, and when the retainer pin is disposed on the linear groove, it is not necessary to consider a phase around the axis of the connecting pin, so that the welding work can be easily performed. Around the axis of the connecting pin, this retainer pin is welded so as to be engaged with, for example, an outer-circumferential-side portion of a link plate forming an endless annular form by connecting pins, and it is also possible that the retainer pin is welded so as to be engaged with an inner-circumferential-side portion of the link plate.

EXAMPLES

Hereinafter, examples of the present invention are described in detail with reference to the drawings. In the examples described below, drawings are simplified or transformed as appropriate, and dimensional ratios and shapes, etc., of the respective portions are not always accurate.

Figure 1:
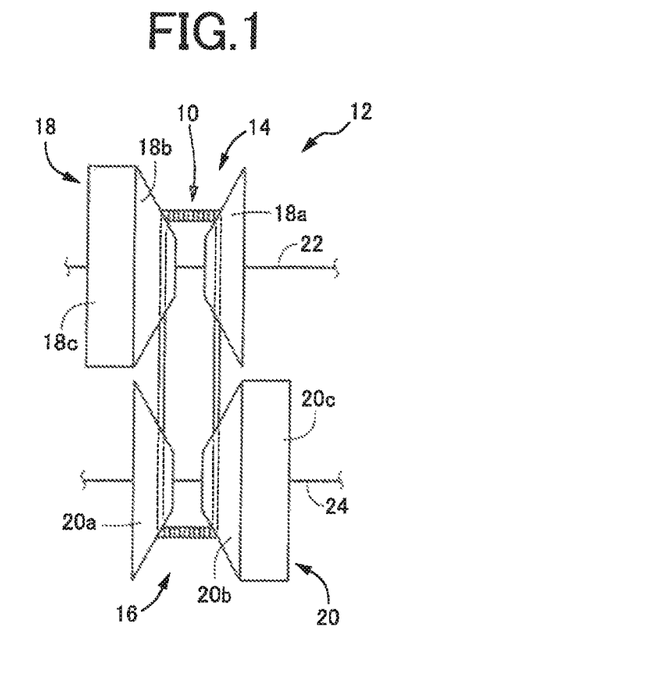
FIG. 1 is a schematic diagram for explaining an example of a belt-driven continuously variable transmission for a vehicle, including a chain belt as an example of the present invention.

FIG. 1 is a schematic configuration diagram of a belt-driven continuously variable transmission 12 for a vehicle, including a chain belt 10 as an example of the present invention. The belt-driven continuously variable transmission 12 includes a pair of variable pulleys 18 and 20 having V-shaped grooves 14 and 16 with variable groove widths formed on outer circumferential portions and provided rotatably around rotational axes parallel to each other, and the chain belt 10 is wound over these pulleys 18 and 20. The variable pulleys 18 and 20 respectively include fixed rotating bodies 18a and 20a fixed to rotary shafts 22 and 24, and movable rotating bodies 18b and 20b provided movably in axial directions relative to the rotary shafts 22 and 24, and the movable rotating bodies 18b and 20b are pressed in directions of approaching the fixed rotating bodies 18a and 20a by pressing devices (hydraulic cylinders, etc.,) 18c and 20c. On surfaces facing each other of the fixed rotating body 18a and the movable rotating body 18b and surfaces facing each other of the fixed rotating body 20a and the movable rotating body 20b, conical surfaces whose distances to each other in the axial directions increase toward the outer sides (outer circumferential sides) in radial directions of the rotating bodies 18a, 18b, 20a, 20b are provided, and each of the V-shaped grooves 14 and 16 is defined by the pair of conical surfaces facing each other. By relatively changing the widths of the V-shaped grooves 14 and 16, a winding diameter of the chain belt 10 is changed and a gear ratio of the belt-driven continuously variable transmission 12 is continuously varied.

Figure 2:
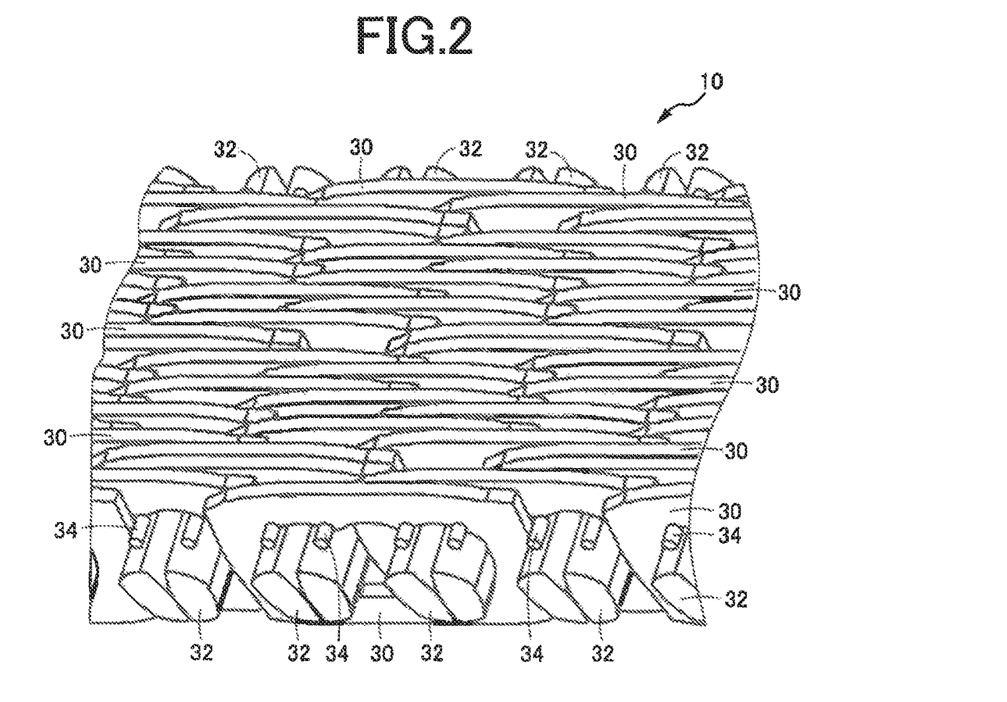
FIG. 2 is a perspective view of a part cut out of the chain belt shown in FIG. 1.
Figure 3:
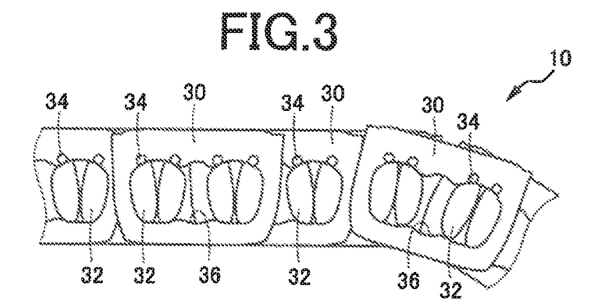
FIG. 3 is a front view of the chain belt in FIG. 2 viewed from an axial direction of connecting pins.
Figure 4:
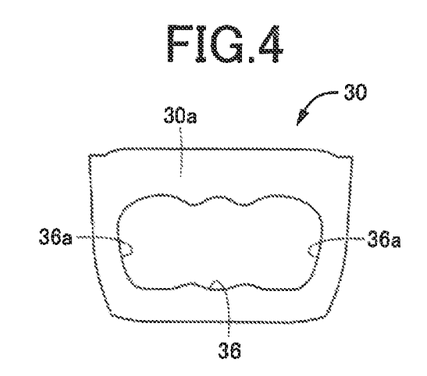
FIG. 4 is a front view of a single link plate of the chain belt in FIG. 2.
Figure 5:
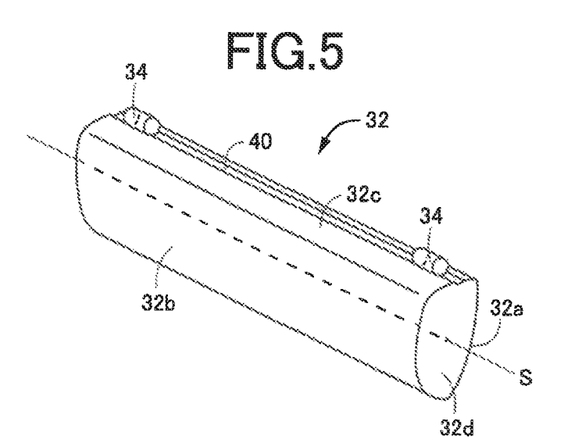
FIG. 5 is a perspective view of a single connecting pin in a state where retainer pins are fixed to both end portions of the connecting pin.

FIG. 2 is a perspective view of a part cut out of the chain belt 10 which includes plurality of link plates 30 having rectangular shapes long in a width direction, and plurality of connecting pins 32 connecting the link plates 30 in an endless annular form. FIG. 3 is a front view of the chain belt 10 in FIG. 2 viewed from an axial direction of the connecting pins 32, FIG. 4 is a front view of a single link plate 30, and FIG. 5 is a perspective view of a single connecting pin 32 in a state where retainer pins 34 are fixed to both end portions of the connecting pin 32. In the link plate 30, a pin hole 36 having a rectangular shape long in the width direction is provided, and in a state where a part of the plurality of link plates 30 are overlapped in the thickness direction and shifted in the width direction, the connecting pins 32 are inserted into the pinholes 36 across the part of the plurality of link plates 30, and accordingly, the link plates 30 are connected in an endless annular form. In detail, the part of the plurality of link plates 30 are overlapped and alternately shifted in the width direction one by one or in pairs, and respective four connecting pins 32 are inserted into the pin hole 36 of each link plate 30, and accordingly, the plurality of link plates 30 are connected in an endless annular form.

The connecting pin 32 is a linear shaft member and has the both end portions projecting outward from the link plates 30 overlapped together, and to the both projecting end portions, the retainer pins 34 are respectively fixed. These retainer pins 34 are engaged with outer-circumferential-side portions 30a of the link plates 30 positioned at both outer sides in an overlapping direction, that is, portions that are on the outer circumferential sides when the link plates 30 are connected in an endless annular form, and that are an upper portion of the link plate 30 in FIG. 4, so as to prevent the link plates 30 from coming off the connecting pin 32.

The connecting pin 32 has a sectional shape constant across the entire length, includes a first side surface 32a having a gently convex curved shape, a second side surface 32b having a convex curved shape with a curvature larger than that of the first side surface 32a, and an upper connecting surface 32c connecting upper end portions of the first side surface 32a and the second side surface 32b and being comparatively flat, and is inserted into the pin hole 36 in a posture in which the upper connecting surface 32c comes to the outer-circumferential-side portion 30a side of the link plate 30. Each of end portions 36a in a longitudinal direction of the pin hole 36 has a curved shape corresponding to the second side surface 32b of each connecting pin 32 so as to allow swingable contact of the connecting pin 32, and accordingly, the plurality of link plates 30 are connected in a foldable manner and the chain belt 10 formed of the link plates 30 can be wound over the variable pulleys 18 and 20. End faces 32d on both sides in the axial direction of the connecting pin 32 are inclined corresponding to the conical surfaces respectively defining the V-shaped grooves 14 and 16, and are pressed against and frictionally contacted with the conical surfaces. Among four connecting pins 32 to be inserted into the pin hole 36 of each link plate 30, a pair of connecting pins 32 positioned at an inner side in the longitudinal direction of the pin hole 36 are engaged with end portions 36a of pin holes 36 of other link plates 30, and are disposed so as to be oriented oppositely to the connecting pins 32 on both ends, that is, disposed so that the first side surfaces 32a face each other.

Figure 6:
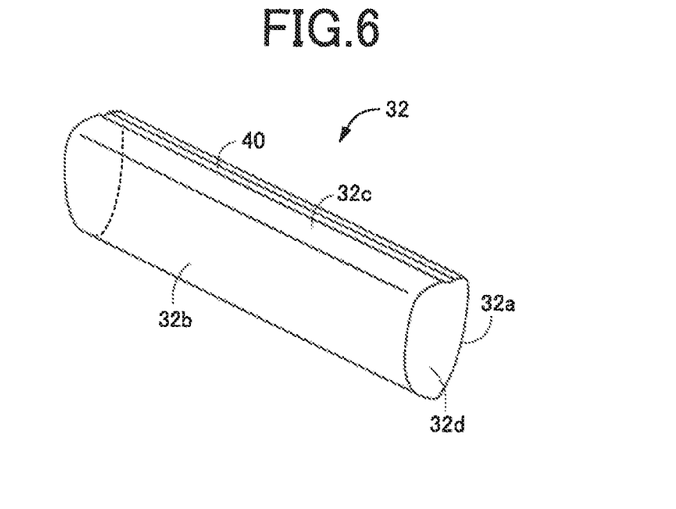
FIG. 6 is a perspective view of the connecting pin before the retainer pins are welded.
Figure 7:
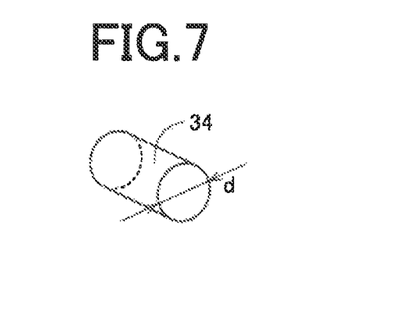
FIG. 7 is a perspective view showing the retainer pin before being welded to the connecting pin.
Figure 8:
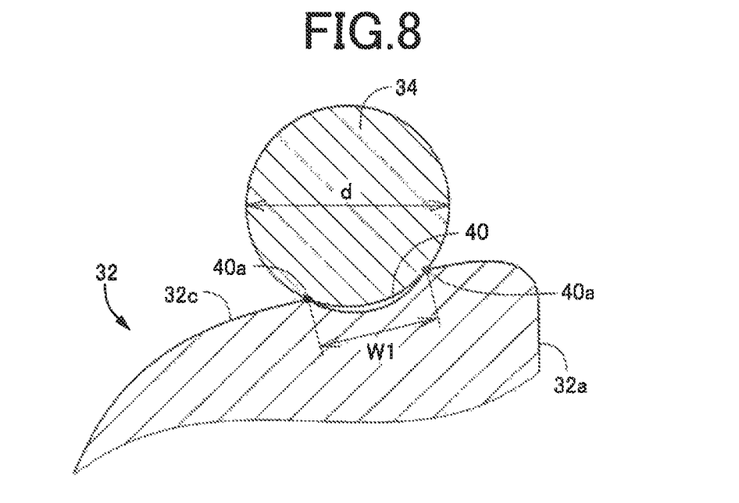
FIG. 8 is a sectional view enlarging a portion where the retainer pin is welded to the connecting pin.

The retainer pin 34 is a shaft member having a short circular columnar shape being circular in section, and is disposed on a linear groove 40 provided in the axial direction of the connecting pin 32 on the upper connecting surface 32c of the connecting pin 32 so as to become parallel to the linear groove 40, and subjected to welding. FIG. 6 is a perspective view of the connecting pin 32 before the retainer pins 34 are welded, FIG. 7 is a perspective view enlarging the retainer pin 34 at an enlargement factor larger than in FIG. 6, and FIG. 8 is a sectional view enlarging a portion where the retainer pin 34 is welded to the connecting pin 32. The retainer pin 34 is formed by cutting a round steel bar or wire material having a circular section and made of a carbon steel, etc., into a predetermined length, and has, for example, a diameter d of approximately 0.4 to 1.0 mm, and a length of 1 to 2 mm. The connecting pin 32 is formed by molding a steel bar such as bearing steel, etc., so as to have a predetermined sectional shape by drawing process and cutting the steel bar into a predetermined length, and the linear groove 40 described above is provided parallel to an axis S of the connecting pin 32 across the entire length of the connecting pin 32, and is formed at the same time as the drawing process. In this specification, the axis S of the connecting pin 32 is a straight line passing through the center of gravity of the connecting pin 32 and extending in a longitudinal direction of the connecting pin 32. An axis of the retainer pin 34 is defined in the same manner.

The linear groove 40 has an arc shape in section, and has a larger curvature than the retainer pin 34, and a width between a pair of open end edges 40a, that is, an open width W1 is smaller than the diameter d of the retainer pin 34. Accordingly, the retainer pin 34 can be disposed so that an outer circumferential surface of the retainer pin 34 comes into contact with the two open end edges 40a on both sides of the linear groove 40, and two points on the outer circumferential surface separated from each other in the circumferential direction can be welded to the connecting pin 32 by resistance welding along the two open end edges 40a of the linear groove 40. That is, by performing resistance welding in a state where the retainer pin 34 is disposed on the linear groove 40 of the connecting pin 32 so as to become parallel to the linear groove 40 and come into contact at two points on the outer circumferential surface with the two open end edges 40a of the linear groove 40 across the entire length in an axial direction of the retainer pin 34, the retainer pin 34 is welded to the connecting pin 32 along the two open end edges 40a. The pair of retainer pins 34 are separately welded to end portions of the connecting pin 32, however, it is also possible to resistance-weld the pair of retainer pins 34 simultaneously to both end portions of the connecting pin 32. It is also possible to weld the retainer pins 34 in the axial direction of the connecting pin 32 along the pair of open end edges 40a from both sides of the retainer pins 34 by using another welding means such as laser welding.

As described above, in the chain belt 10 of the present example, a plurality (in the example, two) of points on the outer circumferential surface of the retainer pin 34 separated from each other in the circumferential direction are welded to the connecting pin 32, so that joint strength between the connecting pin 32 and the retainer pin 34 becomes higher than in a case where only one point on the outer circumferential surface is welded, so that predetermined joint strength can be easily secured regardless of variation in welding, etc., and the retainer pin 34 can be appropriately prevented from coming off the connecting pin 32. Accordingly, control of the welding quality including the welding depth, etc., can be relaxed, and cost reduction is realized.

The linear groove 40 is provided in the axial direction of the connecting pin 32, and the retainer pin 34 is welded to the connecting pin 32 along the two open end edges 40a on both sides of the linear groove 40, so that the joint strength of the retainer pin 34 to the connecting pin 32 is appropriately secured. By disposing the retainer pin 34 so that the outer circumferential surface of the retainer pin 34 comes into contact with the two open end edges 40a of the linear groove 40, the retainer pin 34 can be easily welded to the connecting pin 32 by resistance welding.

The linear groove 40 is provided parallel to the axis S of the connecting pin 32, and in a state where the retainer pin 34 is disposed parallel to the linear groove 40, the retainer pin 34 is welded to the connecting pin 32 at two points on the outer circumferential surface along the two open end edges 40a of the linear groove 40 across the entire length in the axial direction of the retainer pin 34, so that higher joint strength can be stably secured. By disposing the retainer pin 34 on the connecting pin 32 so as to become parallel to the linear groove 40 and come into contact at two points on the outer circumferential surface with the two open end edges 40a of the linear groove 40 across the entire length in the axial direction, the retainer pin 34 can be easily welded to the connecting pin 32 by resistance welding.

The linear groove 40 is provided parallel to the axis S of the connecting pin 32 across the entire length of the connecting pin 32, and to both end portions of the linear groove 40, the retainer pins 34 are welded, so that a substantially symmetrical configuration in the axial direction of the connecting pin 32 is obtained, and as compared with a case where a large-diameter head portion or the like is provided at one end portion of the connecting pin 32 for preventing the link plate 30 from coming off the connecting pin 32, the connecting pin 32 can be made to have a simple shape and produced at low cost. The linear groove 40 is provided parallel to the axis S of the connecting pin 32 across the entire length of the connecting pin 32, so that the linear groove 40 can be provided at the same time the connecting pin 32 is molded so as to have a predetermined sectional shape by drawing process, so that the connecting pin 32 can be manufactured at low cost.

The circular columnar retainer pin 34 having a circular section is used, so that a round steel bar or wire material, etc., can be cut and directly used as the retainer pin 34, and therefore, the retainer pin 34 can be produced at low cost, and when the retainer pin 34 is disposed on the linear groove 40, it is not necessary to consider a phase around the axis S of the connecting pin 32, and the welding work can be easily performed.

Next, another example of the present invention is described. In the following example, a portion in common with the example described above is designated by the same reference sign, and description thereof is omitted.

Figure 9:
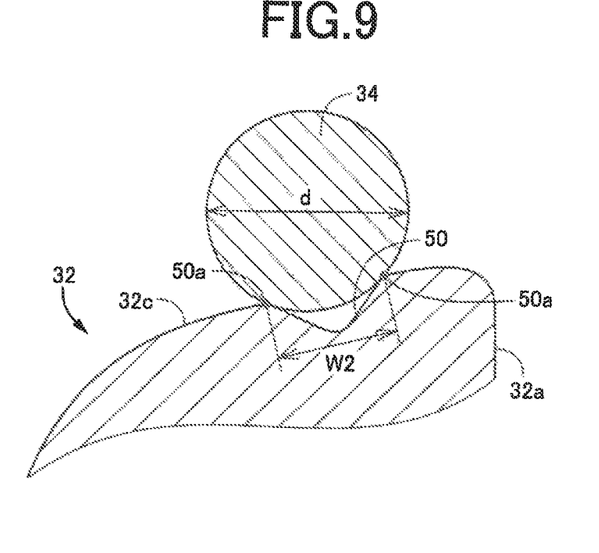
FIG. 9 is a view describing another example of the present invention, and is a sectional view corresponding to FIG. 8.

FIG. 9 is a sectional view corresponding to FIG. 8, and on the upper connecting surface 32c of the connecting pin 32, a linear groove 50 having a V shape in section is provided in the axial direction of the connecting pin 32. Like the linear groove 40, this linear groove 50 is provided parallel to the axis S of the connecting pin 32 across the entire length of the connecting pin 32, and formed at the same time as drawing process. A width between open end edges 50a on both sides of the linear groove 50, that is, an open width W2 is smaller than the diameter d of the retainer pin 34, and the pair of retainer pins 34 are disposed so that the outer circumferential surface of each retainer pin 34 comes into contact with the two open end edges 50a on both sides of the linear groove 50, and welded to the connecting pin 32 in the axial direction along the two open end edges 50a by resistance welding. In the present example, the same operation and effect as in the example described above are obtained. The sectional shape of the linear groove 50 is changeable as appropriate.

Figure 10:
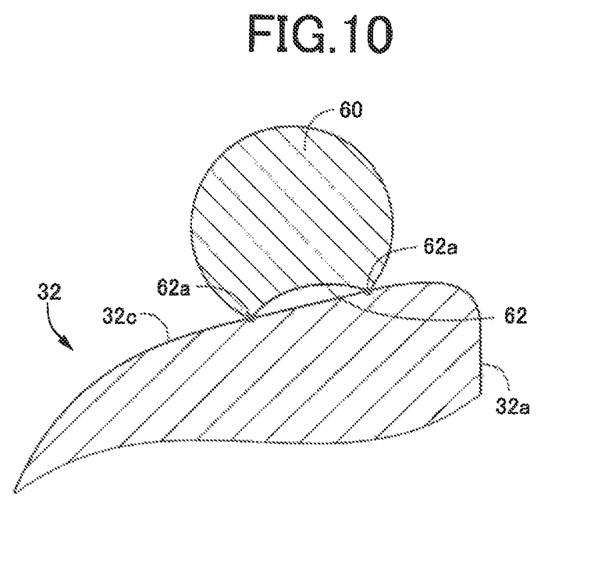
FIG. 10 is a view describing still another example of the present invention, and is a sectional view corresponding to FIG. 8.

FIG. 10 is a sectional view corresponding to FIG. 8, and each of a pair of retainer pins 60 is provided with a linear groove 62 instead of the linear groove 40 provided on the connecting pin 32. The linear groove 62 has an arc shape in section, and is provided across the entire length of the retainer pin 60 in an axial direction thereof so as to become parallel to an axis of the circular columnar retainer pin 60 having a circular section. This linear groove 62 can be provided at the same time as drawing process of a steel bar material or wire material having a circular section as a material of the retainer pin 60, but can also be formed by post processing by press work, cutting work, laser machining, etc. The retainer pin 60 provided with this linear groove 62 is disposed on the connecting pin 32 so as to become parallel to the connecting pin 32 and come into contact at two open end edges 62a of the linear groove 62 with the upper connecting surface 32c of the connecting pin 32 across the entire length in the axial direction, and welded to the connecting pin 32 along the two open end edges 62a across the entire length by resistance welding. Even in the present example, substantially the same operation and effect as in the example described above are obtained. The sectional shape of the linear groove 62 is changeable as appropriate into, for example, a V shape like the linear groove 50 shown in FIG. 9.

Figure 11:
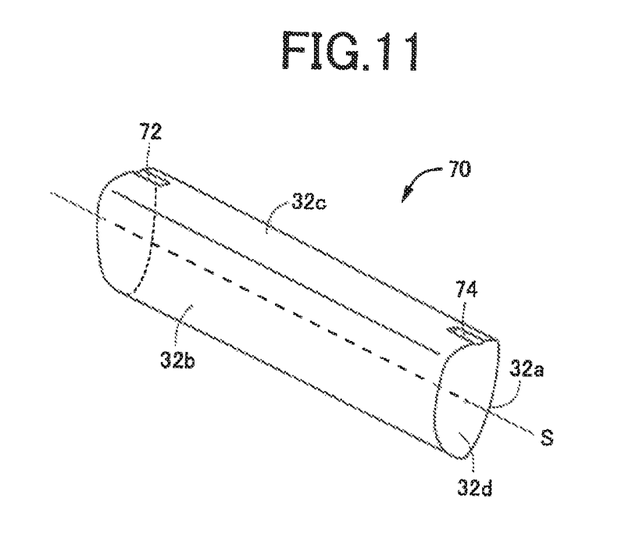
FIG. 11 is a view describing still another example of the present invention, and is a perspective view of another example of the connecting pin corresponding to FIG. 6.

FIG. 11 is a perspective view of a connecting pin 70, corresponding to FIG. 6 described above. This connecting pin 70 is a linear shaft member having a predetermined sectional shape like the connecting pin 32, includes a first side surface 32a, a second side surface 32b, an upper connecting surface 32c, and a pair of end faces 32d, and is molded by, for example, drawing process. On the upper connecting surface 32c of this connecting pin 70, instead of the linear groove 40, a pair of linear grooves 72 and 74 are separately provided on both end portions to which the retainer pins 34 are welded. These linear grooves 72 and 74 are respectively provided parallel to an axis S of the connecting pin 70, and are formed by post processing by press work, cutting work, or laser machining, etc. The connecting pin 70 itself including the linear grooves 72 and 74 may be formed by forge processing such as press work. The pair of retainer pins 34 are respectively disposed parallel to the linear grooves 72 and 74 so that outer circumferential surfaces of the retainer pins 34 come into contact with two open end edges on both sides of the linear grooves 72 and 74 respectively, and are welded to the connecting pin 70 along the respective two open end edges across the entire lengths in the axial direction by resistance welding. In the present example as well, substantially the same operation and effect as in the example described above are obtained.

Although examples of the present invention are described in detail above with reference to the drawings, these are just embodiments, and the present invention can be carried out in variously changed or improved embodiments based on knowledge of persons skilled in the art.

REFERENCE SIGNS LIST

10: Chain belt 12: Belt-driven continuously variable transmission 18, 20: Variable pulley 30: Link plate 30a: Outer-circumferential-side portion 32, 70: Connecting pin 34, 60: Retainer pin 36: Pin hole 40, 50, 62, 72, 74: Linear groove 40a, 50a, 62a: Open end edge S: Axis

What is claimed is:

1. A chain belt comprising:
   plurality of link plates each provided with a pin hole;
   plurality of connecting pins to connect a part of the plurality of link plates in an endless annular form by being inserted into the pin holes across the part of the plurality of link plates in a state where the part of the plurality of link plates are overlapped in a thickness direction and shifted in a width direction; and
   a retainer pin welded to an end portion of each corresponding connecting pin and engaged with each corresponding link plate to prevent the link plate from coming off the connecting pin, wherein
      the retainer pin is disposed in a posture in which an outer circumferential surface of the retainer pin is in contact with an outer circumferential surface of the connecting pin, and a plurality of points on the outer circumferential surface of the retainer pin separated from each other in the circumferential direction are welded to the connecting pin,
      either one of the retainer pin and the connecting pin is provided with a linear groove in an axial direction,
      the linear groove has an arc shape in section, and a curvature of the arc shape of the linear groove is larger than a curvature of the outer circumferential surface of the other of the retainer pin and the connecting pin, and
      the retainer pin is welded to the connecting pin along two open end edges on both sides of the linear groove.

2. The chain belt according to claim 1, wherein
   the linear groove is provided on the connecting pin so as to become parallel to an axis of the connecting pin,
   the retainer pin is disposed parallel to the linear groove, and welded at two points on the outer circumferential surface of the retainer pin to the connecting pin, and
   each of the two points on the outer circumferential surface of the retainer pin extends along a corresponding one of the two open end edges of the linear groove and has a same length as an entire length of the retainer pin in the axial direction.

3. The chain belt according to claim 2, wherein
   the linear groove is provided on the connecting pin so as to become parallel to the axis of the connecting pin and so as to have a same length as an entire length of the connecting pin in the axial direction, and each retainer pin is respectively welded to both end portions of the connecting pin.

4. The chain belt according to claim 1, wherein
the retainer pin is welded to the connecting pin so as to be engaged with an outer-circumferential-side portion of the link plate forming the endless annular form by the connecting pin.

5. The chain belt according to claim 1, wherein
the chain belt is for a belt-driven continuously variable transmission, to be used by being wound over a pair of variable pulleys having V-shaped grooves whose widths are variable.

6. A belt-driven continuously variable transmission comprising
a pair of variable pulleys having V-shaped grooves widths of which are variable, and the chain belt according to claim 1 which is wound between the pair of variable pulleys.

7. A belt-driven continuously variable transmission comprising
a pair of variable pulleys having V-shaped grooves widths of which are variable, and the chain belt according to claim 2 which is wound between the pair of variable pulleys.

8. A belt-driven continuously variable transmission comprising
a pair of variable pulleys having V-shaped grooves widths of which are variable, and the chain belt according to claim 3 which is wound between the pair of variable pulleys.

9. A belt-driven continuously variable transmission comprising
a pair of variable pulleys having V-shaped grooves widths of which are variable, and the chain belt according to claim 4 which is wound between the pair of variable pulleys.

10. A method of manufacturing a chain belt including
plurality of link plates each provided with a pin hole,
plurality of connecting pins to connect a part of the plurality of link plates in an endless annular form by being inserted into the pin holes across the part of the plurality of link plates in a state where the part of plurality of link plates are overlapped in a thickness direction and shifted in a width direction, and
a retainer pin welded to an end portion of each corresponding connecting pin and engaged with each corresponding link plate to prevent the link plate from coming off the connecting pin, wherein
either one of the retainer pin and the connecting pin is provided with a linear groove in an axial direction,
the linear groove has an arc shape in section, and a curvature of the arc shape of the linear groove is larger than a curvature of an outer circumferential surface of the other of the retainer pin and the connecting pin, and
the retainer pin is resistance-welded to the connecting pin along two open end edges on both sides of the linear groove in a state where the retainer pin is disposed so as to come into contact at two points on an outer circumferential surface of the retainer pin separated from each other in a circumferential direction with an outer circumferential surface of the connecting pin via the two open end edges.

11. The method of manufacturing a chain belt according to claim 10, wherein the linear groove is provided on the connecting pin so as to become parallel to an axis of the connecting pin, and
in a state where the retainer pin is disposed on the connecting pin so as to become parallel to the linear groove and come into contact at the two points on the outer circumferential surface of the retainer pin with the two open end edges of the linear groove, the retainer pin is resistance-welded to the connecting pin along the two open end edges.

12. The method of manufacturing a chain belt according to claim 11, wherein
the connecting pin is provided with the linear groove which is parallel to the axis of the connecting pin and which has a same length as an entire length of the connecting pin in the axial direction, and the linear groove is made at the same time the connecting pin is molded so as to have a predetermined sectional shape by drawing process, and
each retainer pin is respectively resistance-welded to both end portions of the connecting pin.

13. A chain belt comprising:
plurality of link plates each provided with a pin hole;
plurality of connecting pins to connect a part of the plurality of link plates in an endless annular form by being inserted into the pin holes across the part of the plurality of link plates in a state where the part of the plurality of link plates are overlapped in a thickness direction and shifted in a width direction; and
a retainer pin welded to an end portion of each corresponding connecting pin and engaged with each corresponding link plate to prevent the link plate from coming off the connecting pin, wherein
the retainer pin is disposed in a posture in which an outer circumferential surface of the retainer pin is in contact with an outer circumferential surface of the connecting pin, and a plurality of points on the outer circumferential surface of the retainer pin separated from each other in a circumferential direction are welded to the connecting pin,
the connecting pin is provided with a linear groove in an axial direction,
the retainer pin is welded to the connecting pin along two open end edges on both sides of the linear groove,
the linear groove is provided on the connecting pin so as to become parallel to an axis of the connecting pin,
the retainer pin is disposed parallel to the linear groove, and welded at two points on the outer circumferential surface of the retainer pin to the connecting pin,
each of the two points on the outer circumferential surface of the retainer pin extends along a corresponding one of the two open end edges of the linear groove and has a same length as an entire length of the retainer pin in the axial direction,
the linear groove is provided on the connecting pin so as to become parallel to the axis of the connecting pin and so as to have a same length as an entire length of the connecting pin in the axial direction, and
each retainer pin is respectively welded to both end portions of the connecting pin.

14. The chain belt according to claim 13, wherein
the retainer pin is welded to the connecting pin so as to be engaged with an outer-circumferential-side portion of the link plate forming the endless annular form by the connecting pin.

15. The chain belt according to claim 13, wherein
the chain belt is for a belt-driven continuously variable transmission, to be used by being wound over a pair of variable pulleys having V-shaped grooves whose widths are variable.

16. A belt-driven continuously variable transmission comprising
a pair of variable pulleys having V-shaped grooves widths of which are variable, and the chain belt according to claim 13 which is wound between the pair of variable pulleys.

17. A belt-driven continuously variable transmission comprising
a pair of variable pulleys having V-shaped grooves widths of which are variable, and the chain belt according to claim 14 which is wound between the pair of variable pulleys.

18. A method of manufacturing a chain belt including
plurality of link plates each provided with a pin hole,
plurality of connecting pins to connect a part of the plurality of link plates in an endless annular form by being inserted into the pin holes across the part of the plurality of link plates in a state where the part of plurality of link plates are overlapped in a thickness direction and shifted in a width direction, and
a retainer pin welded to an end portion of each corresponding connecting pin and engaged with each corresponding link plate to prevent the link plate from coming off the connecting pin, wherein
the connecting pin is provided with a linear groove in an axial direction,
the retainer pin is resistance-welded to the connecting pin along two open end edges on both sides of the linear groove in a state where the retainer pin is disposed so as to come into contact at two points on an outer circumferential surface of the retainer pin separated from each other in a circumferential direction with an outer circumferential surface of the connecting pin via the two open end edges,
the linear groove is provided on the connecting pin so as to become parallel to an axis of the connecting pin,
in a state where the retainer pin is disposed on the connecting pin so as to become parallel to the linear groove and come into contact at the two points on the outer circumferential surface of the retainer pin with the two open end edges of the linear groove, the retainer pin is resistance-welded to the connecting pin along the two open end edges,
the connecting pin is provided with the linear groove which is parallel to the axis of the connecting pin and which has a same length as an entire length of the connecting pin in the axial direction, and the linear groove is made at the same time the connecting pin is molded so as to have a predetermined sectional shape by drawing process, and
each retainer pin is respectively resistance-welded to both end portions of the connecting pin.

* * * * *